United States Patent [19]

Leonard et al.

[11] 3,724,672
[45] Apr. 3, 1973

[54] ASYMMETRIC HOLLOW FIBER MEMBRANES AND METHOD OF FABRICATION

[76] Inventors: Richard Lloyd Leonard, 111 Dunedin Ct., Cary, N.C. 27511; John Darrell Bashaw, 317 Wesley Dr., Chapel Hill, N.C. 27514

[22] Filed: July 27, 1970

[21] Appl. No.: 58,509

[52] U.S. Cl. .....................210/500, 264/41, 264/177, 264/200
[51] Int. Cl. ..............................................B01d 39/00
[58] Field of Search ......210/22, 23, 321, 500; 55/16, 55/158; 264/41, 49, 258, 177, 277, 279, 200, 209

[56] References Cited

UNITED STATES PATENTS 3,674,628  7/1972  Fabre ..............................210/321 X
3,412,184  11/1968  Sharples et al. .........................264/49
3,228,876  1/1966  Mahon ....................................210/22
2,988,418  6/1961  Finlayson et al..................264/200 X
3,439,074  4/1969  Sharples et al. .........................264/41
3,592,953  7/1971  Ward......................................264/49

*Primary Examiner*—Frank A. Spear, Jr.
*Attorney*—Frank A. Lukasik and Gersten Sadowski

[57] ABSTRACT

This invention is directed to hollow filament membranes derived from esters of cellulose and characterized by a density gradient in the filament wall structure. When employed in reverse osmosis operations the filaments exhibit extraordinary flux and rejection properties. A continuous fabricating method is also provided which comprises continuously extruding filaments into a controlled evaporation zone thence directing the filaments into a cold water coagulation bath, thereafter passing the same to a wash bath and finally to an annealing zone.

4 Claims, 1 Drawing Figure

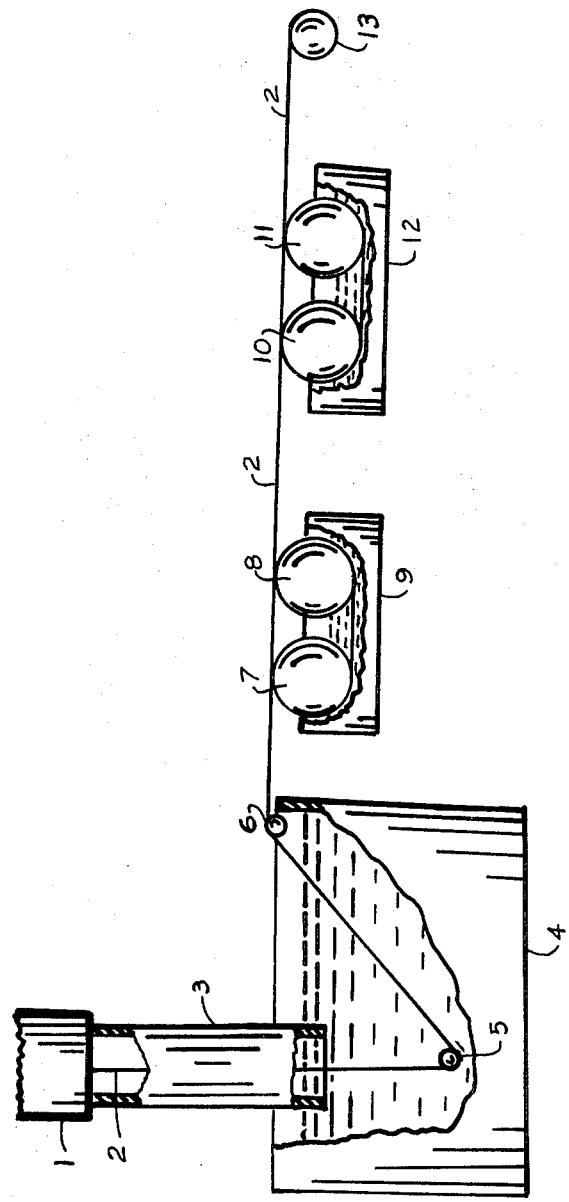

ASYMMETRIC HOLLOW FIBER MEMBRANES AND METHOD OF FABRICATION

BACKGROUND OF THE INVENTION

With ever increasing demand, the need for useable water has become a worldwide problem. As a consequence, various governments and other institutions have been actively engaged in extensive research programs in an effort to recover purified water economically from saline water, such as sea water or brackish water sources. From the results to date, it appears that the most promising approach to the demineralization of these water sources is by practicing the principle of reverse osmosis.

The reverse osmosis process (also known as ultrafiltration) involves the use of a driving pressure in excess of the osmotic pressure (approximately 350 p. s. i. for sea water) to force pure water through a selective membrane which is capable of rejecting the dissolved salts. The flow of water under the applied hydrostatic pressure is in a direction opposite to that normally observed with osmosis where the driving force is the solute concentration gradient between opposite sides of the osmotic membrane.

The principle requirement for bringing this promising process to economic practicality is the availability of a separation membrane that will operate with acceptably high flux rates (rate of water transfer through the membrane), together with a corresponding high percentage of solute rejection.

For the most part, development efforts on permeability membranes have been concentrated primarily on thin, uniplanar membranes or films which are rigidly supported in perforated or porous backing members in order to withstand the required operating pressure. Obviously, in such an arrangement, a membrane sheet of an excessively large area is required to achieve any results that are at all practical. The economic implications of this disadvantage are readily apparent. Furthermore, in such installations, "dead" areas are present that actually constitute portions which are unavailable for permeation purposes. These originate in the spaces where the membranes are pressed against the backing plates in the apparatus. Consequently, the "free" area available for permeation is reduced in accordance with the total "dead" area required for supporting the membrane.

Because of these problems with planar membranes affecting economics in an adverse way i. e., the uneconomic space requirements of a pressure vessel and the added expense of required porous support material, attention has recently been given to employing extremely fine hollow fibers as permeable membranes. The operation of reverse osmosis for desalination with hollow filaments or fibers involves collecting relatively salt free water as permeate from one side of the hollow membrane—for example, from the fiber bore—while passing the saline or brackish water over the opposite side of the hollow fiber membrane—for example, the outer surface—under pressure such that water permeates the wall of the hollow fibers while restricting the flow in that direction of the saline constituents. Hollow fibers have the great advantage over flat membranes in that permeation or available surface area is immensely increased thereby substantially reducing pressure vessel space requirements. Moreover strong, porous support members are not required since the hollow fiber geometry is self-supporting and high pressures can be utilized without deleteriously affecting the membrane wall.

Unfortunately, these great advantages over planar membranes which are inherent in hollow fiber geometry, enormous membrane surface area per unit volume and the elimination of expensive porous supports required for flat membranes—have not to date been brought to full realization. For example, when considering heretofore known hollow filament membranes of cellulose acetate, it is found that at practical levels of Na Cl rejection they exhibit low water transport or flux rates, 0.03–0.04 gal/ft$^2$ day at 600 p. s. i. At appreciably higher flux rates, poor salt retention in comparison with flat cellulose acetate reverse osmosis membranes is obtained. The water transport rate in previous practical hollow fiber systems has been limited by the fact that the fiber walls have an essentially dense, homogeneous structure. By contrast, flat cellulose acetate membranes utilized for reverse osmosis are highly asymmetric, having a very thin selective film layer which is supported by a non-selective, porous member which offers little resistance to flow. These membranes have high water transport rates, 10–50 gal/ft$^2$ day at 600 p. s. i., and up to 98 percent rejection of sodium chloride.

OBJECTS OF INVENTION

Accordingly, it is an object of this invention to provide a hollow filament reverse osmosis membrane with the inherent geometrical advantage together with water transport and solute rejection properties heretofore found only in planar membranes.

It is a further object of this invention to provide a hollow filament reverse osmosis membrane derived from cellulose esters having flux and rejection properties not heretofore realized with hollow filaments.

It is a still further object of this invention to provide a process for preparing hollow filament membranes from cellulose esters having vastly improved properties.

DESCRIPTION OF INVENTION

As previously noted, this invention provides reverse osmosis membranes of fine, hollow fibers comprised of cellulosic esters. It has been observed that the water permeation rate across the fibers at comparable salt rejection obtained in accordance with the method of this invention is at least five times and up to one hundred times greater that that of heretofore known hollow fiber systems fabricated from the same cellulosic substrate. A unique feature of our fibers which contributes very substantially to the remarkable water transport properties is the asymmetric structure of the fiber walls. That is, the walls have a density gradient running progressively less dense from the outer surface to the surface facing the hollow area. This morphology can best be described as a skin-core structure. It is in sharp contrast to the essentially homogeneous structure of previous hollow fiber membrane systems, and accounts largely for the vast improvement in the flux rate property.

For a better understanding of the process of this invention reference is made to the drawing appended hereto wherein a schematic flow diagram generally outlines the required steps. The process flow will be described using cellulose acetate for purposes of illustration.

After forming a viscous solution of cellulose acetate (the spinning dope), the cellulose acetate dope is extruded through a hollow filament shaping orifice in spinnerette 1 into an evaporative gap or zone 3. The evaporative zone is most critical to the formation of high flux fibers. The filament must be extruded into an atmosphere rich in a cellulose acetate solvent. This is accomplished in the present invention by enclosing the extrusion orifice in what may be likened to a chimney. The chimney rapidly becomes saturated with solvent evaporating from the hot dope. Once saturated at chimney temperature, further evaporation is greatly slowed. The rapid cooling during the evaporative phase causes gelation and the rapid viscosity build-up aids in maintaining the hollow fiber structure which has been shaped by the extrusion orifice. From the evaporative zone, the fiber is passed to coagulation bath 4, which is a water bath maintained at ice water temperatures. By immersion in this cold water bath the filament structure becomes set. The filament then passes over roller 5, which is driven at a greater speed than the extrusion velocity to effect a stretching and consequent reduction of the filament diameter to bring it within an outside diameter of from 100 to 700 microns and preferably from about 200 to 400 microns in outside diameter. From roller 5 the filament is forwarded over guide 6 to revolving wash drums 7 and 8 which are partially immersed in water tank 9. In this washing zone remaining traces of solvent are removed. From passage around wash drums 7 and 8 the filament is advanced to revolving drums 10 and 11 which are positioned in hot water bath 12. The filament passes around drums 10 and 11 and through the hot water in bath 12. The water in this zone is maintained at a temperature of from about 65°C to about 95°C. The purpose of this heat treatment or annealing operation is to effect a contraction or a tightening of the filament structure which still permits the transfer of water, but restrains the passage of salt. Finally, the filament is forwarded to a take-up bobbin 13. Alternatively, the filament bypasses the hot water bath 12 and is taken up on the bobbin 13 for subsequent annealing.

As previously noted, the fiber-forming substrate employed in the method of this invention is an ester of cellulose. Specific examples are cellulose acetate, cellulose acetate-butyrate and cellulose propionate, with cellulose acetate being the ester of choice.

In forming the spinning solutions, it has been found that a combination acetone-formamide in ratios in the range of 3:2 or 2:3 is the solvent of choice. However, other well known solvents for cellulosic esters could be utilized either alone or in combination, examples being dioxane, tetrahydrofuran, methyl formamide, dimethylformamide and ethylformamide. The spinning solutions should have a solids or solute content of from about 25–35 percent by weight of the solution. Further, it is desirable that the dope have a viscosity of approximately 1,000 poises at 50°C, since the fiber wall tends to close off the bore at dope viscosities below this level. The extrusion dope differs from that used in casting flat membranes in that the dope viscosity must be much higher to spin hollow fibers with a "dry" spinnerette.

Normally, at room temperature, the dopes are in a gelled state which is broken by heating just prior to extrusion. The rapid cooling during the evaporative phase again causes gelation and the rapid viscosity build-up aids in maintaining a hollow fiber structure.

The initial phase of fiber formation is, of course the extrusion of cellulose ester solution through a shaped orifice. The hollow profiles depend upon the design of the spinnerette. These usually are made of stainless steel or of hardened special steels. Many designs are known to the art, such as the segmented arc configuration, plug-in-orifice and others such as disclosed in U.S. Pat. No. 3,405,424.

As has been noted, the filament passes through an evaporative zone immediately following extrusion. The conduct of this operation is most critical to the formation of high flux fibers. If the evaporation of solvent is too fast, the resulting fiber has low flux-high rejecting capabilities even without the annealing step. If the evaporation is prevented by spinning into an atmosphere rich in a good solvent other than the spinning solvent, the fiber can exhibit high flux but low rejection even when annealed at high temperatures. It has been found that for best results at normal spinning temperatures, the exposure time of the filament in the evaporative zone should be from about 0.01 to about 1.0 seconds.

The annealing procedure, like the evaporative step, has a substantial influence on the resulting flux-rejection properties. The temperature range found generally acceptable is between 65° to 95°C with about 75° to 90°C being preferred operating limits. Higher annealing temperatures within this range yield fibers with low flux-high rejection. Similar effect on properties is experienced with prolonged annealing times; i.e. fiber properties are determined by the time-temperature during annealing. Following take-up after completion of processing, care should be taken not to permit air drying of fiber inasmuch as loss of moisture results in a drastic loss of the acquired flux property.

To our knowledge the water transport rates and corresponding salt rejection have not been approached by prior art hollow fiber membranes of any type. For example, following a commonly used performance test procedure, we obtain flux rates of at least one gallon per square foot of membrane surface per day with a corresponding sodium chloride rejection of at least 90 percent and have observed flux rates of better than 7 gallons per square foot per day with 90 or more percent salt rejection. This test procedure is conducted by employing an aqueous sodium chloride solution containing 3000 ppm of sodium chloride at a temperature of 70°F and using a pressure of 250 psig with product water discharge at atmospheric pressure.

In practical application a plurality of the fibers of this invention are formed into a membrane within a separatory apparatus or cell. Means for accomplishing this are well known and widely varied. Any of the known methods for forming the membrane and separatory cell designs may be used, for example, such as described in U.S. Pat. Nos. 3,228,877; 3,342,729; 3,422,008 and 3,475,331.

To further illustrate the invention the following examples are presented. The information given before the table are constants for all of the examples.

Dope: 30% cellulose acetate by weight in 40:60 acetone-formamide mixture.

Extrusion: tube in orifice hollow filament spinnerette, single hole, extrusion rate - 1.22 cubic centimeters per minute.

Evaporative Chimney: dimension - ¾ × 3½" outside diameter.

Spinning rate: 70 feet per minute.

Fiber Dimensions: outside diameter 296 microns, inside diameter 100 microns.

| Example | Annealing Time | Annealing Temp. | Flux gal/sq.ft-day | Rejection % |
|---|---|---|---|---|
| 1 | 5 | 75°C | 6.30 | 93.8 |
| 2 | 15 | 75°C | 5.91 | 95.0 |
| 3 | 5 | 80°C | 2.90 | 97.1 |
| 4 | 15 | 80°C | 2.34 | 97.8 |
| 5 | 5 | 85°C | 1.32 | 98.4 |
| 6 | 15 | 85°C | 1.03 | 98.5 |

In each of the above examples the feed water presented to the membrane contained 3000 ppm of sodium chloride and was at ambient temperature. The pressure employed was 250 psig, and each of the runs was of 2 days duration.

It will be understood that the foregoing description and examples are only illustrative of the present invention and it is not intended that the invention be limited thereto. All substitutions, alterations and modifications of the present invention which come within the scope of the following claims or to which this invention is readily susceptible without departing from the spirit and scope of this disclosure are considered part of the present invention.

We claim:

1. A method for preparing asymmetric hollow filament reverse osmosis membranes comprising:
   a. forming a hot dope consisting essentially of a cellulose ester in a solvent, said dope having a solids content of from about 25–35 percent by weight,
   b. extruding said hot dope through a shaping orifice to form a hollow filament,
   c. passing said hollow filament for about 0.01 to 1.0 second through an evaporative zone rich in said solvent wherein said hollow filament is rapidly cooled and gelled,
   d. immersing said hollow filament directly into a water coagulation bath maintained at the temperature of ice water,
   e. washing said hollow filament with water to remove any traces of said solvent remaining in the filament after said immersion in ice water,
   f. annealing said hollow filament in a hot water bath maintained at a temperature in the range of about 65° to 95°C.

2. The method of claim 1, wherein said cellulose ester is cellulose acetate and wherein said solvent is a mixture of formamide and acetone.

3. The method of claim 1, wherein said annealing temperature is in the range of about 75° to 90°C.

4. A reverse osmosis membrane comprised of asymmetric hollow filaments derived from an ester of cellulose and produced by the method of claim 1.

* * * * *